July 10, 1956  J. E. BUXTON ET AL  2,753,720

ENGINE STARTER GEARING

Filed Sept. 2, 1953

WITNESS:
Esther M. Stockton

INVENTORS
James E. Buxton
Donald L. Miller
BY
Clinton S. Janes
ATTORNEY

United States Patent Office 2,753,720
Patented July 10, 1956

2,753,720

ENGINE STARTER GEARING

James E. Buxton, Elmira, and Donald L. Miller, Horseheads, N. Y., assignors to Bendix Aviation Corporation, a corporation of Delaware Application September 2, 1953, Serial No. 378,003

4 Claims. (Cl. 74—7)

The present invention relates to engine starter gearing and more particularly to a starter drive of the type which maintains the gearing meshed until the engine is reliably self-operative, incorporating a self-tightening friction coupling with load limiting means.

It is an object of the present invention to provide a novel engine starter drive which engages smoothly and quietly and dissipates shock loads which exceed a predetermined maximum.

It is another object to provide such a device which is simple and economical in construction and of small dimensions consonant with its torque capacity.

Figure 1:
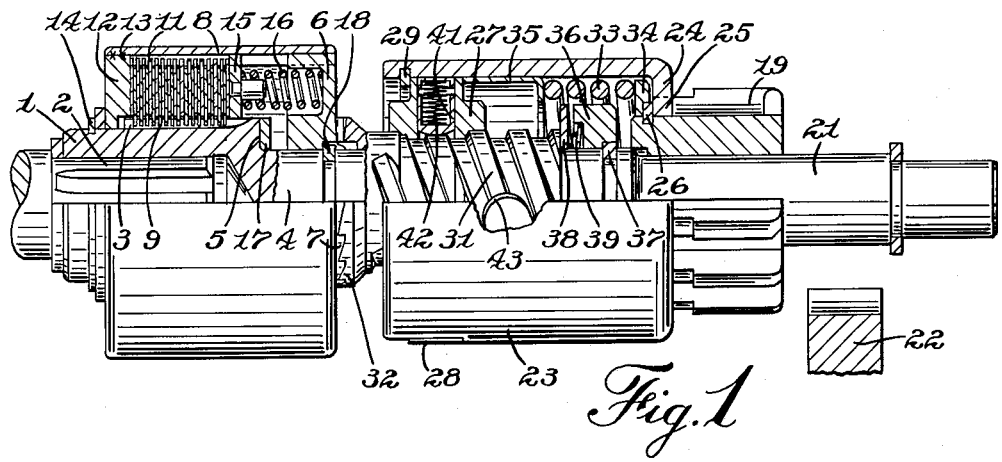
Figure 2:
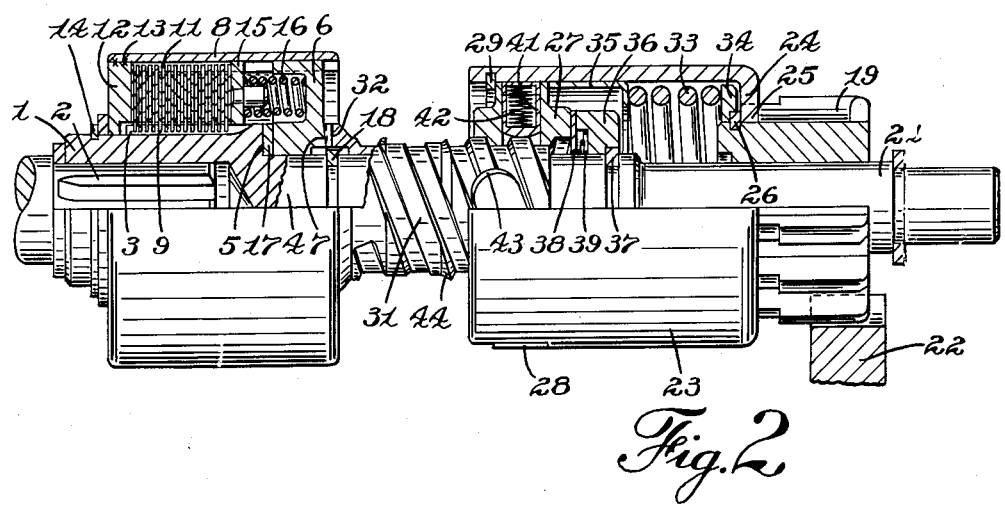

Further objects and advantages will be apparent from the following description taken in connection with the accompanying drawing in which:

Fig. 1 is a side elevation partly broken away and in section of a preferred embodiment of the invention; and Fig. 2 is a similar view showing the parts in cranking position.

In Fig. 1 of the drawing there is illustrated a power shaft 1 which may be the extended armature shaft of a starting motor not illustrated, or may be coupled to such an armature shaft as indicated at 2. Shaft 1 is formed with splines 3 for a portion of its length and has a smooth reduced portion 4, the reduction in diameter forming a radial shoulder 5.

An overrunning clutch member 6 having inclined teeth 7 is slidably journaled on the smooth portion 4 of the power shaft and is splined within a coupling sleeve 8. Sleeve 8 is frictionally connected to the power shaft by means of clutch discs 9 and 11 splined alternately to the power shaft and sleeve and retained in the sleeve by means of an annular plate member 12 fixed within the sleeve in any suitable manner as by brazing as indicated at 13, and located on the power shaft by means of a lock ring 14.

Means for yieldably loading or compressing the clutch discs 9, 11 is provided comprising an annular pressure plate 15 slidably mounted in the sleeve 8, and a plurality of springs 16 located between the pressure plate 15 and the dentil clutch member 6. Compression of the springs 16, and consequently the loading of the friction clutch 9, 11 is limited by the shoulder 5 on the power shaft which arrests the movement of the dentil clutch member 6, a thrust washer 17 being preferably interposed therebetween. Adjustment of the maximum torque to be transmitted through the friction clutch may be accomplished by using thrust washers of varying thickness.

Means for maintaining the friction clutch 9, 11 under initial pressure is provided in the form of a lock ring 18 seated in a groove in the power shaft and limiting the movement of the dentil clutch member 6 away from the shoulder 5.

A pinion 19 is slidably journaled on a further reduced portion 21 of the power shaft for movement into and out of mesh with a gear 22 of the engine to be started. A barrel member 23 is formed with an inturned terminal flange 24 having a splined connection 25 to the pinion, and retained on the hub of the pinion by a lock ring 26. A control nut 27, provided with radial lugs 28 is retained in corresponding slots in the barrel 23 by means of a lock ring 29, and is threaded on a screw shaft 31 which is slidably journaled on the smooth portion 4 of the power shaft and is provided with overrunning clutch teeth 32 cooperating with the teeth 7 of the dentil clutch member 6.

The pinion 19 is yieldably maintained in extended relation to the barrel 23 by means of a mesh enforcing spring 33 located between a thrust ring 34 mounted on the hub of the pinion against the lock ring 26, and a spacing thimble 35 which seats against the control nut 27.

Meshing movement of the pinion and barrel assembly is limited by a stop ring 36 located on the power shaft by means of a lock ring 37. A thrust washer 38 is interposed between the control nut 27 and stop ring 36, and also serves to transmit to the screw shaft 31 the pressure of a light clutch spring 39 located in a recess in the stop ring 36 and effective to normally maintain the overrunning clutch teeth 7, 32 in engagement.

Centrifugally releasable means for holding the pinion 19 in mesh with the engine gear 22 is provided comprising a detent or latch 41 mounted for radial sliding movement in the control nut 27 and yieldably pressed against the surface of the screw shaft by a spring 42. The screw shaft is formed with a cut-away portion forming a shoulder 43 so positioned as to receive the detent 41 when the pinion 19 is meshed with the engine gear 22 and to resist demeshing movement of the control nut.

In operation, starting with the parts in the positions illustrated in Fig. 1, rotation of the power shaft 1 by the starting motor is transmitted through the friction clutch 9, 11 to the sleeve 8, and through its splined connection to the dentil clutch member 6. The consequent rotation of the screw shaft 31 traverses the control nut 27 and barrel member 23 to the right, which motion is yieldably transmitted through the spring 33 to the pinion 19 to move it into mesh with the engine gear 22. If a tooth of the pinion should abut against a tooth of the engine gear, the longitudinal movement of the pinion is arrested and the meshing spring 33 compressed. This backward pressure is transmitted through the control nut and screw shaft to the dentil clutch member 6 which causes the pressure on clutch springs 16 to be built up to thereby increase the loading on the friction clutch 9, 11 and thus build up torque sufficient to index the pinion teeth into proper registry with the tooth spaces of the engine gear, after which the meshing spring 33 expands and the meshing movement of the barrel and pinion assembly continues until the control nut 27 is arrested by the stop ring 36.

Thereafter, the screw shaft 31 and clutch member 6 are forced backward by the screw-jack action of the screw shaft and control nut, compressing the clutch springs 16 and thus increasing the torque capacity of the friction clutch. If the initial shock load exceeds a predetermined desirable maximum, the backward movement of the dentil clutch member 6 is arrested by the thrust ring 17 as it rests against the shoulder 5, and any excess torque is dissipated by slippage of the clutch discs 9, 11.

When the engine starts, immediate demesh of the pinion 19 is prevented by the engagement of the detent 41 in the control nut against the shoulder 43 on the screw shaft. At this time, however, the release of the cranking torque allows the screw shaft to move to the right against the pressure of the clutch spring 39, permitting the clutch teeth 7, 32 to overrun. If the engine fails to continue self-operative, cranking will be resumed as soon as the rotation of the starting motor exceeds the speed of the pinion 19 as rotated by the engine gear 22. When a successful start is secured, the consequent high speed rotation of the pinion 19 by the engine gear withdraws the detent 41 by centrifugal force, allowing the pinion and barrel assembly to be traversed back to idle position. The parts are yieldably retained in idle position by suitable means such as an inclined shoulder 44 (Fig. 2) formed on the screw shaft in position to cooperate with the detent 21 for that purpose.

Although but one embodiment of the invention has been shown and described in detail, it will be understood that changes may be made in the design and arrangement of parts without departing from the spirit of the invention.

We claim:

1. In an engine starter drive a power shaft having a splined portion and a smooth reduced portion defined by a shoulder adjacent to the splined portion, a dentil overrunning clutch member slidably journalled on said smooth portion, a coupling sleeve splined on the dentil clutch member, a friction clutch having driving and driven members splined to the power shaft and the coupling sleeve respectively, means for loading the friction clutch including a compression spring between the friction clutch and the dentil clutch member, a screw shaft slidably journalled on the power shaft having clutch teeth cooperating with those of the dentil clutch member, a control nut threaded on the screw shaft, a pinion slidably journalled on the power shaft for movement into and out of mesh with an engine gear, means including a barrel member connecting the control nut to the pinion, and a stop for the control nut on the power shaft defining the operative position of the pinion.

2. An engine starter drive as set forth in claim 1 including further a splined connection between said pinion and barrel, means for retaining the pinion in the barrel, and yielding means between the pinion and control nut normally holding the pinion in extended relation to the barrel.

3. An engine starter drive as set forth in claim 1 in which the shoulder on the power shaft formed by its reduction in diameter limits the travel of the dentil clutch member and consequently limits the loading of the friction clutch; and including further a stop ring on the power shaft cooperating with the dentil clutch member to initially load the friction clutch.

4. An engine starter drive as set forth in claim 3 including further spring means on the power shaft for urging the screw shaft toward the dentil clutch member, and a centrifugally released detent on the control nut cooperating with a shoulder on the screw shaft to oppose demeshing movement of the control nut.

References Cited in the file of this patent
UNITED STATES PATENTS
2,606,449  Digby _____ Aug. 12, 1952